(12) United States Patent
Neilson et al.

(10) Patent No.: US 8,924,028 B2
(45) Date of Patent: Dec. 30, 2014

(54) BATTERY-POWERED CONTROL VALVE AND OPERATION THEREOF

(75) Inventors: Paul C. Neilson, Denver, CO (US); Paraj Jivan Kayande, Calgary (CA)

(73) Assignee: Control Microsystems, Inc., Kanata, Ontario (CA)

( * ) Notice: Subject to any disclaimer, the term of this patent is extended or adjusted under 35 U.S.C. 154(b) by 479 days.

(21) Appl. No.: 13/195,258

(22) Filed: Aug. 1, 2011

(65) Prior Publication Data
US 2013/0035796 A1 Feb. 7, 2013

(51) Int. Cl.
G05D 7/06 (2006.01)
G05D 16/20 (2006.01)

(52) U.S. Cl.
CPC .................... *G05D 16/2013* (2013.01)
USPC ...................... 700/282; 251/129.01

(58) Field of Classification Search
None
See application file for complete search history.

(56) References Cited

U.S. PATENT DOCUMENTS

| | | | | |
|---|---|---|---|---|
| 5,238,023 | A * | 8/1993 | Olofsson | 137/596.17 |
| 5,636,653 | A * | 6/1997 | Titus | 137/14 |
| 5,819,336 | A | 10/1998 | Gilliam et al. | |
| 6,131,609 | A | 10/2000 | Metso et al. | |
| 6,598,454 | B2 | 7/2003 | Brazier et al. | |
| 6,655,404 | B2 | 12/2003 | Hilaire | |
| 6,685,159 | B1 | 2/2004 | Schnell | |
| 2001/0035512 | A1 | 11/2001 | Messer et al. | |
| 2002/0121617 | A1 | 9/2002 | Hu | |
| 2005/0049755 | A1 * | 3/2005 | Boger | 700/282 |
| 2005/0082503 | A1 | 4/2005 | Patterson et al. | |
| 2008/0072369 | A1 | 3/2008 | Funari et al. | |
| 2008/0257415 | A1 | 10/2008 | Ohmi et al. | |
| 2011/0043937 | A1 * | 2/2011 | Juncker et al. | 359/846 |
| 2011/0144675 | A1 * | 6/2011 | Gao et al. | 606/167 |

FOREIGN PATENT DOCUMENTS

CN 101697418 A 4/2010

OTHER PUBLICATIONS

International Search Report from corresponding PCT/US2011/046102 mailed Jul. 30, 2012.
Chi Jin et al: "Enhancement of low voltage ride-through capability for wind turbine driven DFIG with active crowbar and battery energy storage system", Power and Energy Society General Meeting, 2010 IEEE, IEEE, Piscataway, NJ, USA, Jul. 25, 2010, pp. 1-8, XP031985207, DOI: 10.1109/PES.2010.5588180; ISBN: 978-1-4244-6549-1.

* cited by examiner

*Primary Examiner* — Ryan Jarrett
(74) *Attorney, Agent, or Firm* — Lando & Anastasi, LLP

(57) ABSTRACT

The present disclosure describes, among other things, a method. The method may include receiving an instruction to actuate a valve. The method may also include receiving a first period of time. The method may also include applying energy to the valve for the first period of time. The method may also include comparing a first state of the valve with a state in the instruction. The method may also include determining a second period of time by increasing the first period of time. The method may also include applying energy to the valve for the second period of time. The method may also include determining that a second state of the valve matches the state in the instruction.

17 Claims, 7 Drawing Sheets

BATTERY-POWERED CONTROL VALVE AND OPERATION THEREOF

BACKGROUND

Valves are often used to control the flow of fluids and/or gases. Since the valves may be located in remote and/or dangerous areas, controlling the valves is important.

SUMMARY

In some aspects, the present disclosure describes a method. The method may include receiving an instruction to actuate a valve. The method may also include receiving a first period of time. The method may also include applying energy to the valve for the first period of time. The method may also include comparing a first state of the valve with a state in the instruction. The method may also include determining a second period of time by increasing the first period of time. The method may also include applying energy to the valve for the second period of time. The method may also include determining that a second state of the valve matches the state in the instruction.

Receiving the instruction to actuate may include receiving an instruction to open the valve and/or receiving an instruction to close the valve. Receiving the instruction to actuate may include receiving the instruction through wireless communication. Receiving the first period of time may include retrieving a default period of time associated with actuating the valve to the state in the instruction. The default period of time may be about 10 ms or about 30 ms. The first period of may be a period of time previously used to actuate the valve to the state in the instruction. Applying the energy to the valve may include applying current to a coil of a solenoid latching valve. Applying the energy to the valve may include charging a capacitor with energy from a battery and using the capacitor to apply current to the valve.

Comparing the first state of the valve with the state in the instruction may include determining that the first state of the valve does not match the state in the instruction. Comparing the first state of the valve with the state in the instruction may include determining a pressure in an area adjacent to the valve, determining the first state of the valve based at least in part on the pressure, and determining that the first state of the valve does not match the state in the instruction. Determining the second period of time may include increasing the first period of time by a fixed period of time or increasing the first period of time by a percentage. Determining that the second state of the valve matches the state in the instruction may include overwriting the first period of time with the second period of time.

In some aspects, the present disclosure describes a method. The method may include receiving an instruction to actuate a valve. The method may also include receiving a first period of time. The method may also include applying energy to the valve for the first period of time. The method may also include determining a pressure in an area adjacent to the valve. The method may also include determining a first state of the valve based on a comparison between the pressure and a threshold. The method may also include comparing the first state of the valve with the state in the instruction. The method may also include determining a second period of time by increasing the first period of time. The method may also include applying energy to the valve for the second period of time. The method may also include determining that a second state of the valve matches the state in the instruction.

In some aspects, the present disclosure describes a method. The method may include receiving, by a communication device, an instruction to open a valve. The method may also include determining a first period of time. The method may also include applying energy to the valve for the first period of time. The method may also include determining that the valve is open. The method may also include receiving an instruction to close the valve. The method may also include determining a second period of time. The method may also include applying energy to the valve for the second period of time. The method may also include determining that the valve is closed. The first period of time may not be equal to the second period of time.

In some aspects, the present disclosure describes a system. The system may include a communication device that receives an instruction to actuate a valve from a remote unit, a processing unit, a battery, a capacitor, a pressure sensor, and a memory. The memory may store instructions that, when executed by the processing unit, cause the processing unit to: receive a first period of time; operate the battery and the capacitor to apply energy to a valve for the first period of time; determine a first state of the valve based on a comparison between a threshold and a pressure measurement from the pressure sensor disposed in a gas outlet adjacent to the valve; determine the first state of the valve does not match a state in the instruction; determine a second period of time by increasing the first period of time; operate the battery and the capacitor to apply energy to the valve for the second period of time; and determine a second state of the valve matches the state in the instruction.

In some aspects, the present disclosure describes a method. The method may include receiving, by a wireless communication device, an instruction to actuate a valve. The method may also include receiving a period of time. The method may also include applying energy from a battery to the valve for the period of time. Receiving the instruction may include receiving the instruction via radio frequency communication. Applying the energy from the battery may include charging a capacitor with energy from the battery; and using the capacitor to apply current to a coil of a solenoid latching valve. Applying the energy from the battery may include operating a pump to raise a voltage on the capacitor to a voltage for operating the solenoid latching valve.

In some aspects, the present disclosure describes a system. The system may include a wireless communication device that receives an instruction to actuate a valve from a remote unit, a processing unit, a battery, a capacitor, and a memory. The memory may store instructions that, when executed by the processing unit, cause the processing unit to: receive a period of time; and operate the battery and the capacitor to apply energy to a valve for the period of time.

In some aspects, the present disclosure describes a method. The method may include receiving an instruction to actuate a valve. The method may also include receiving a first period of time. The method may also include applying energy to the valve for the first period of time. The method may also include determining a first state of the valve matches the state in the instruction. The method may also include increasing a number of actuations of the valve. The method may also include comparing the number of actuations of the valve and a threshold. The method may also include overwriting the first period of time with a second period of time when the number of actuations of the valve equals the threshold.

Overwriting the first period of time may include determining the second period of time based on a default period of time, determining the second period of time by decreasing the first period of time, determining the second period of time by decreasing the first period of time by a fixed period, or determining the second period of time by decreasing the first period of time by a percentage. The method may also include resetting the number of actuations of the valve when the number of actuations equals the threshold.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1:
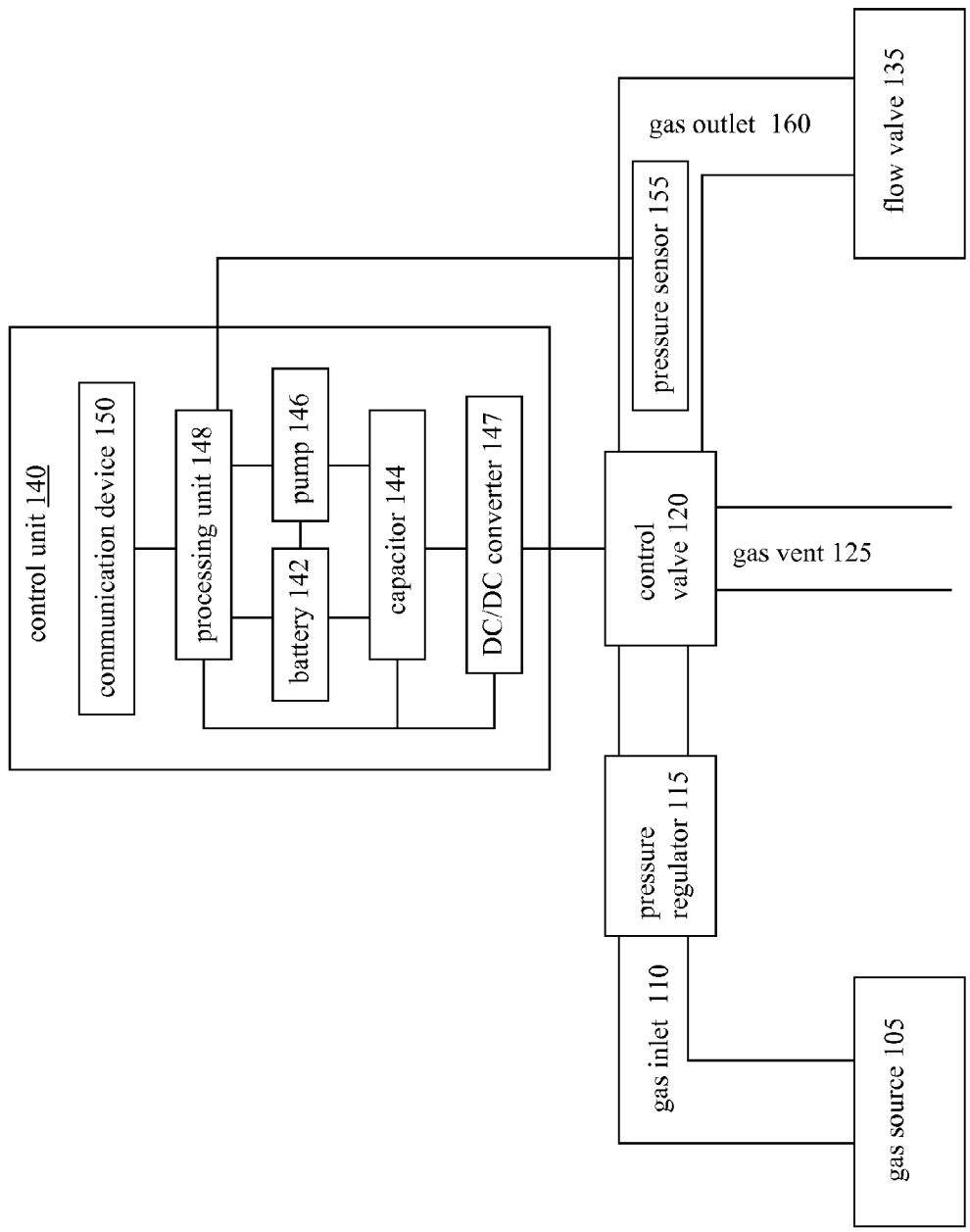
FIG. 1 is a block diagram of an exemplary system for operating a battery-powered control valve.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Valves may be used for the control of flow of fluids and/or gases (also referred herein as "flow valves"). Flow valves may use springs to maintain a default position. The default position may be open or closed. A flow valve with a default open position by a spring may be called a normally opened flow valve. A flow valve with a default closed position by a spring may be called a normally closed flow valve. In some implementations, gas pressure may be used to operate a pneumatic actuator which may provide a force for affecting the position of the flow valve. For example, by applying pressure to a pneumatic actuator, the actuator may move a flow valve against the force of the spring into a new position. If the pressure is removed, the spring of the flow valve may return the flow valve to the default position.

The flow valve may be opened or closed according to a pressure of gas applied to the actuator. A control valve may be operated (e.g., opened and/or closed) to connect or disconnect the actuator from the pressure of a flow of gas. The amount of energy required to operate the control valve may vary according to environment conditions, such as temperature and/or humidity. The amount of energy required may vary according to other factors, such as the design of the control valve, the extent of the control valve's corrosion, and/or the pressure of gas from the gas source.

Applying amounts of energy that operate the control valve under extreme conditions may ensure consistent successful operation, but such expenditures may be wasteful. Further, should the control valve use such high levels of energy, the control valve may require a wired connection to a large power supply. Since applications may be located in remote and/or dangerous locations, the susceptibility of the wired connections to environmental conditions may impact the system's reliability.

Referring now to FIG. 1, a system 100 for operating a battery-powered control valve is shown and described. In general overview, a gas source 105 may connect to a gas inlet 110. A pressure regulator 115 may regulate the pressure of gas flowing from the gas source 105, through the gas inlet 110, to a control valve 120. The control valve 120 may be a three-way valve with connections to a gas vent 125 and a gas outlet 130. When the control valve 120 is closed, the control valve 120 may connect the gas inlet 110 to the gas vent 125. When the control valve 120 is open, the control valve 120 may connect the gas inlet 110 to the gas outlet 130, which may direct the flow of gas to the flow valve 135.

The control valve 120 may be connected to a control unit 140, which may include a battery 142, a capacitor 144, a pump 146, a DC/DC converter 147, a processing unit 148, and a communication device 150. The communication device 150 may receive an instruction from one or more remote devices to actuate the control valve 120 (e.g., open or close the valve). The instruction may include the desired state of the control valve 120.

The processing unit 148 may determine a period of time for powering the control valve 120 to actuate the control valve 120 to the desired state. The processing unit 148 may operate the battery 142 and/or pump 146 to charge the capacitor 144. In some implementations, the processing unit 148, battery 142, and/or pump 146 may maintain the capacitor 144 in a fully charged state. The processing unit 148 may operate the DC/DC converter 147 to power the control valve 120 for the period of time, using energy stored on the capacitor 144.

A pressure sensor 155 may be disposed in a gas outlet 160 adjacent to the control valve 120. The pressure sensor 155 may measure the flow of gas in the outlet 160. The processing unit 148 may use data from the pressure sensor 155 to determine the state of the control valve 120. For example, if the data indicates the pressure in the gas outlet 160 exceeds a threshold, the control valve 120 is open (e.g., gas is flowing from the gas inlet 110 to the gas outlet 160). If the data falls below the threshold, the control valve 120 is closed (e.g., no gas is flowing into the gas outlet 160, and the gas outlet 160 may be connected to a region at atmospheric pressure).

If the control valve 120 is not in the desired state included in the instruction, the processing unit 148 may increase the period of time for powering the control valve 120. The powering unit 148 may operate the DC/DC converter 147 to power the control valve 120 for the increased period of time. The processing unit 148 may determine the state of the control valve 120 based on updated data from the pressure sensor 155. The powering unit 148 may continue increasing the period of time for powering the control valve 120 until the control valve is actuated to the desired state included in the instruction.

In further detail, in operation, when the system 100 is installed and/or reset (e.g., recovering from system failure), the processing unit 148 may initialize the period of time for powering the control valve 120 to open the control valve 120 (also referred to herein as "open period of time"). The processing unit 148 may initialize the period of time for powering the control valve 120 to close the control valve 120 (also referred to herein as "close period of time"). In some implementations, the processing unit 148 may initialize the open and close periods of time to default values. In some implementations, the default value for the open period of time may be different from the default value for the close period of time. The processing unit 148 may receive the default values from a remote unit operated by a user to control the system 100 remotely. The processing unit 148 may retrieve the default values from memory (e.g., a buffer in the control unit 140, a cache for the processing unit 148).

The communication device 150 may receive an instruction from a remote unit (not shown), which may be operated by a user to control the system 100 remotely. In some implementations, the communication device 150 may receive the instruction using wireless communication. For example, the device 150 may receive the instruction via radio frequency communication. The communication device 150 may send the instruction to the processing unit 148.

The processing unit 148 may determine a desired state of the control valve 120 based on the instruction. For example, the processing unit 148 may analyze the instruction at a bit reserved for the desired state of the control valve 120. A bit set to one (1) may correspond to an instruction to open the control valve 120 and the bit set to zero (0) may correspond to an instruction to close the control valve 120, or vice versa. In some implementations, the processing unit 148 may determine the instruction is an instruction to open the control valve 120. In some implementations, the processing unit 148 may determine the instruction is an instruction to open the control valve 120. Although operations and/or implementations may be described herein in the context of instructions to open the control valve 120, any of the steps described herein in any combination may be applied for instructions to close the control valve 120.

The processing unit 148 may determine the open period of time. The processing unit 148 may retrieve the open period of time from memory. The processing unit 148 may determine an amount of energy needed to power the control valve 120 for the open period of time. The processing unit 148 may determine the amount of energy based at least in part on the open period of time and/or at least one parameter of the capacitor 144. For example, the processing unit 148 may determine the amount of energy based on the capacitance of the capacitor 144, the voltage at which the capacitor 144 operates, any other parameter of the capacitor 144, or any combination thereof.

The processing unit 148 may operate the battery 142 and/or pump 146 to charge the capacitor 144. In some implementations, the processing unit 148 may operate the battery 142 and/or pump to maintain the capacitor 144 in a fully charged state. In some implementations, the pump 146 may charge the capacitor 144 to a higher voltage than the battery 142 (e.g., 5.3V). The DC/DC converter 147 may convert the voltage on the capacitor 144 to the voltage for operating the control valve 120 (e.g., 12 V).

In some implementations, the processing unit 148 may operate the DC/DC converter 147 to power the control valve 120. The DC/DC converter 147 may apply stored energy on the capacitor 144 to the control valve 120. In some implementations, the control valve 120 may be a latching solenoid valve. The DC/DC converter 147 may apply a current to a coil of the solenoid. The DC/DC converter 147 may apply the current for the open period of time. In response to the current, a magnet of the solenoid valve may latch and hold the valve in a state (e.g., open).

If the current causes the control valve 120 to open, gas may flow from the gas inlet 110 through the control valve 120 into the gas outlet 160. As the gas enters the outlet 160, the pressure in the gas outlet 160 may increase quickly and/or fluctuate before stabilizing. In some implementations, the processing unit 148 may allow a period of time to elapse, as the pressure stabilizes (also referred to herein as a "stabilization period"). Exemplary stabilization periods may include 15 seconds, 20 seconds, and 240 seconds, although other values may be used.

The pressure sensor 170 may determine the pressure in the gas outlet 160. The pressure sensor 170 may send the pressure to the processing unit 148. The processing unit 148 may compare the pressure in the gas outlet 150 to a pressure threshold. If the pressure in the gas outlet 150 falls below the pressure threshold, the processing unit 148 may determine that the control valve 120 is closed. If the pressure in the gas outlet 150 equals or exceeds the pressure threshold, the processing unit 148 may determine that the control valve 120 is open.

If the processing unit 148 determines the control valve 120 is closed, the processing unit 148 may increase the open period of time. The processing unit 148 may increase the open period of time by a period of time, a percentage, or any other metric for increasing the period (also referred to herein as "open increment"). For example, the processing unit 148 may increase the open period of time by 30 ms, although other values may be used. In another example, the processing unit 148 may increase the open period of time by the length of the default open period of time. In some implementations, the processing unit 148 may determine that the increased open period of time exceeds a maximum period of time for applying power to the control valve 120. The processing unit 148 may maintain the open period of time at the maximum period of time. In some implementations, the processing unit 148 may overwrite the stored, prior open period of time with the increased and/or maximum open period of time.

The processing unit 148 may operate the battery 142 and/or pump 146 to charge the capacitor 144 to a fully charged state. The processing unit 148 may operate the DC/DC converter 147 to power the control valve 120 for the increased period of time. After the DC/DC converter 147 and capacitor 144 power the control valve 120, the processing unit 148 may determine the state of the control valve 120. If the control valve 120 is still closed, the processing unit 148 may continue increasing the period of time for powering the control valve 120 until the control valve 120 opens.

In some implementations, the processing unit 148 may store the number of unsuccessful attempts to open the control valve 120. After each unsuccessful attempt, the processing unit 148 may increment the number of unsuccessful attempts. The processing unit 148 may reset the number of unsuccessful attempts to open the control valve 120 to zero (0) when the control valve 120 opens. When the control valve 120 does not open, the processing unit 148 may compare the number of unsuccessful attempts with a threshold (also referred to herein as "attempt threshold"). If the number of unsuccessful attempts equals the threshold, the processing unit 148 may allow a period of time to elapse before powering the control valve 120 (also referred to herein as a "wait period"). Thus, the system 100 may contemplate waiting for temporary conditions, such as unfavorable temperatures or heavy winds, to subside before further expending the battery's 142 energy to power the control valve 120. In some implementations, after the wait period elapses, the processing unit 148 may reset the number of unsuccessful attempts to zero (0).

Any values may be used for the attempt threshold and/or the wait period. In some implementations, the attempt threshold may be 15. In some implementations, the attempt threshold may be 5, 10, or 20, although other values may be used. In some implementations, the wait period may be 600 seconds. In some implementations, the wait period may be between about 0 seconds and about 60,000 seconds, although other ranges of values may be used.

In some implementations, the processing unit 148 may store a number of consecutive successful actuations for the currently stored open period of time. The processing unit 148 may reset a number of consecutive successful actuations to zero (0) when use of an open period of time retrieved from memory fails to open the control valve 120 (e.g., the period of time needs to be increased). In some implementations, when use of a retrieved open period of time successfully opens the control valve 120, the processing unit 148 may increase the number of consecutive successful actuations. For example, the processing unit 148 may increment the number.

After a threshold number of consecutive successful actuations, the processing unit 148 may attempt to decrease the open period of time. Thus, the system 100 contemplates management of battery use. For example, under adverse conditions, the control valve 120 may open after the system 100 powers the control valve 120 for the maximum period of time. The maximum period of time may be stored, and the processing unit 148 may continue to retrieve this maximum period each time the control valve is to be opened. However, since adverse conditions may have subsided, shorter periods of time may be sufficient to open the control valve 120. Decreasing the open period of time may avoid continuing to expend maximum energy for each actuation.

In some implementations, the processing unit 148 may compare the number of consecutive successful actuations with a threshold (also referred to herein as "consecutive actuation threshold"). In some implementations, the threshold may be twenty-four (24) consecutive successful actuations, although other values may be used.

When the number of consecutive successful actuations equals the threshold, the processing unit 148 may decrease the open period of time. In some implementations, the processing unit 148 may decrease the open period of time by a fixed period (e.g., 10 ms, 30 ms). In some implementations, the processing unit 148 may decrease the open period of time by any percentage. For example, the percentage may be 10%. Thus, when the open period of time is 100 ms, the processing unit 148 may decrease the period by 10 ms. When the open period is 160 ms, the processing unit 148 may decrease the open/close period by 16 ms. The control unit 150 may power the control valve 120 for the decreased open period of time. If the decreased open period did not open the control valve 120, the processing unit 148 would increase the period of time, according to any of the steps described herein.

In some implementations, the processing unit 148 may decrease the open period of time by resetting the open period of time to a default value. For example, the processing unit 148 may retrieve a default value from memory and set the open period to the default value. In some implementations, the default value for the open period of time may be 30 ms. The control unit 150 may power the control valve 120 for the default open period of time. If the default open period did not open the control valve 120, the processing unit 148 would increase the period of time, according to any of the steps described herein.

In some implementations, the processing unit 148 may store a number of consecutive successful actuations that opened the valve 120 and a number of consecutive successful actuations that closed the valve 120. Thus, the processing unit 148 may record the successes for the open period of time separately from the successes for the close period of time. In some implementations, when the number of consecutive successful actuations that opened the valve 120 equals a first threshold, the processing unit 148 may decrease the open period of time. The close period of time may remain unchanged. Likewise, when the number of consecutive successful actuations that closed the valve 120 equals a second threshold, the processing unit 148 may decrease the close period of time. The open period of time may remain unchanged.

In some implementations, the processing unit 148 may store a total number of consecutive successful actuations. The total number may include the number of consecutive successful actuations that opened the valve 120 and the number of consecutive successful actuations that closed the valve 120. When the total number equals a third threshold, the processing unit 148 may decrease both the open and close periods of time, according to any of the steps described herein.

In some implementations, to close the control valve 120, the control unit 150 applies a reverse current to a solenoid in the control valve 120 relative to the current applied to open the valve 120.

In some implementations, in operation, the communication device 150 may receive overlapping instructions from the remote unit. The most recently received instruction may override prior instructions. For example, the communication device 150 may receive an instruction to open the control valve 120. At any time before the control unit 140 finishes powering to open the valve 120, the communication device 150 may receive an instruction to close the valve 120. In some implementations, the communication device 150 may receive the later instruction while the battery 140 is charging the capacitor 144. In some implementations, the communication device 150 may receive the later instruction while the capacitor 144 is powering the control valve 120.

In some implementations, upon receipt of the instruction to close the valve 120, the processing unit 148 may halt execution of the instruction to open the valve 120 (e.g., halt charging of the capacitor 144, halt powering of the valve 120). The processing unit 148 may compare data from the pressure sensor 155 with the pressure threshold to determine the state of the control valve 120. If the control valve 120 is still closed, the processing unit 148 may conclude processing both instructions because the control valve's 120 state matches the desired state of the most recently received instruction. The capacitor 144 may maintain any energy stored thereon, thereby preserving energy expended from the battery 142.

If the control valve 120 has opened, the processing unit 148 may operate the battery 142 and/or pump 146 to charge the capacitor 144 based on the close period of time.

In some implementations, the processing unit 148 may determine the state of the control valve 120 upon receipt of instructions to actuate the valve 120. The processing unit 148 may use data from the pressure sensor 155 to determine the current state of the valve 120. If the current state matches the desired state in the instruction, the processing unit 148 may conclude processing of the instruction. In some implementations, the communication device 150 may send a message to the remote until indicating the current state of the control valve 120. If the states do not match, the processing unit 148 may retrieve the period of time corresponding to the desired state and power the control valve 120, according to any combination of the steps described herein.

In some implementations, the processing unit 148 may determine that the control valve 120 may be stuck. The control unit 150 may power the control valve 120 for the open period of time a predetermined number of times (e.g., 3 times, 5 times). In some implementations, when the control valve 120 is stuck, the processing unit 148 may increase the open period of time in a logarithmic manner. In some implementations, if the control unit 150 attempts a predetermined threshold of unsuccessful actuations to open the control valve 120, the control unit 150 may send an error signal to the remote unit. Personnel from the remote unit may arrange for workers to fix the valve 120 in the field.

The system 100 may experience shocks due to environmental factors, among other conditions. Such shocks may disrupt the control valve 120 and change its state (e.g., the shock may open a previously closed valve). In some implementations, the processing unit 148 may monitor the state of the valve 120. For example, the processing unit 148 may compare data from the pressure sensor 155 with the pressure threshold every 2 hours, although other periods of time may be used. If the valve's 120 state does not match the desired state in the most recently received instruction, the control unit 150 may power the control valve 120 back into the desired state.

In some implementations, the control unit 150 may store parameters for operating the control valve 120 upon start-up. The control unit 150 may retrieve these parameters when the control unit 150 is installed on another system, recovers from system failure, resumes operations after battery replacement, or in any other situation. In some implementations, the start-up state of the control valve 120 may be "open." The processing unit 148 determines the state of the control valve using pressure from the pressure sensor 155. If the control valve 120 is not open, the control unit 150 powers the control valve to open, according to any of the steps described herein. In some implementations, the user of the system 100 may configure the start-up parameters.

In some implementations, the processing unit 148 may store parameters for operating the control valve 120 under failsafe conditions. For example, the processing unit 148 may operate according to the parameters if the communication device 150 loses contact the remote unit (e.g., radio frequency communications fail). For example, the remote unit may periodically send the communication device 150 a test signal to verify communication is possible. The remote unit may send the test signal every fifteen (15) minutes, although any other periods of time may be used. If the communication device 150 has not received and/or processed a test signal within a predetermined period of time (e.g., 45 minutes), the processing unit 148 may operate the control valve 120 according to the parameters. For example, the state of the control valve 125 under failsafe conditions may be "closed." If the control valve 120 is open, the control unit 150 may operate to close the valve 120.

In some implementations, the communication device 150 may send information about the system 100 to the remote unit. The device 150 may send information on a periodic basis (e.g., every three hours). Exemplary information may include the status of the battery (e.g., low battery, remaining energy in battery), state of the control valve 120, and/or state of the pressure sensor 155 (e.g., operational, communicating with processing unit 148), and/or information about any other component of the system 100. Exemplary information may include the total number of attempts to actuate the control valve 120, which the remote unit may use to gauge the battery life. Exemplary information may include the total number of actuations of the control valve 120, which the remote unit may use to gauge the remaining lifespan of the control valve 120.

Any period of time described herein may be configured by a user of the system 100. In some implementations, the system 100 includes default values for the periods of time (e.g., default open and close periods, open and close decrements, maximum open and close periods, stabilization periods, wait periods). The system 100 may allow a user to change any of the values. In some implementations, some of the values may not be changed. For example, a maximum open or close period may be determined by the parameters of the capacitor 144; thus, a user may not increase the maximum open or close period.

In some implementations, the open and close periods may be expressed in milliseconds, although other units of time may be used. The default open period of time may be about 30 ms. In some implementations, a user of the system 100 may configure the default open period of time. The default open period of time may be set between about 1 ms and about 50 ms, although other ranges of values may be used. In some implementations, the user may configure the maximum open period of time. For example, the maximum open period of time may be set to 200 ms, although other values may be used.

In some implementations, the user may configure the open increment. In some implementations, the open increment may be set to the default open period of time, although other periods of time may be used. Thus, any open period of time used by the processing unit 148 may be a multiple of the default value. For example, if the default open period of time is set to 30 ms, possible open periods of time for applying energy to open the control valve 120 may include 60 ms, 90 ms, 120 ms, 150 ms, and/or 180 ms.

In some implementations, the default close period of time may be about 10 ms. In some implementations, a user of the system 100 may configure the default close period of time. The default close period of time may be set between about 1 ms and about 50 ms, although other ranges of values may be used. In some implementations, the user may configure the maximum close period of time. For example, the maximum close period of time may be set to 200 ms, although other values may be used.

In some implementations, the user may configure the close increment. In some implementations, the close increment may be set to the default close period of time, although other periods of time may be used. Thus, any close period of time used by the processing unit 148 may be a multiple of the default close period of time. For example, if the default open period of time is set to 10 ms, possible close periods of time for applying energy to close the control valve 120 may include 20 ms, 30 ms, 40 ms, 50 ms, and/or 60 ms.

In some implementations, the user may configure the wait period. The wait period may be about 600 seconds, although other values may be used. In some implementations, the user may configure the stabilization period. The user may configure the stabilization period to be between about 15 seconds and about 240 seconds, although other ranges of values may be used. In some implementations, the stabilization period may be about 20 seconds.

In some implementations, the pressure threshold may be expressed in pounds per square inch (e.g., psi). The pressure threshold may be 45 psi. In some implementations, the pressure threshold may be between about 0 psi and about 200 psi. The pressure threshold may be expressed in any other unit, as would be appreciated by one of ordinary skill in the art (e.g., bars, pascals, torr, atmospheres). The pressure threshold may be configured by a user of the system 100.

In some implementations, the battery 142 may have a low operating current. The operating current may be too low to actuate the control valve 120. In some implementations, the battery 142 may be used with a capacitor 144 and/or DC/DC converter 147. By transferring energy from the battery to the capacitor 144 and using a DC/DC converter 147 to power the control valve 120 via the capacitor 144, the system 100 may function using a battery with a low operating current.

In some implementations, any of the functionality described herein may be implemented in software, hardware, firmware, or any combination thereof.

In some implementations, an air compressor may be substituted for the gas source 105. In some implementations, the gas inlet 110 may include compression fitting-equipped tubing. The tubing may withstand gas pressure of about 125 psig.

In some implementations, the pressure regulator 115 may receive a flow of gas at pressures up to about 125 psig. The pressure regulator 115 may output a flow of gas at different pressures. For example, the pressure regulator 115 may output a flow of gas at 105 psig.

In some implementations, a gas filter (not shown) may be disposed proximate to the pressure regulator 114. The gas filter may filter particles up to about 50 μm, although filters designed to filter particles of different sizes may also be used (e.g., 3-100 μm).

In some implementations, the control valve 120 may draw less than 13 W, although valves 120 that draw other levels of wattage may be used (e.g., 5 W, 20 W).

In some implementations, the control valve 120 may operate at 24 V, although valves that operate at other voltages may be used. The control valve 120 may be explosion-proof (e.g., XP). The control valve 120 may be a general purpose valve. In some implementations, the control valve 120 may include a two-wire or three-wire solenoid. In some implementations, the control valve 120 may be used in a Division I hazardous area. The control valve 120 may be compatible with natural gas.

Exemplary control valves 120 include: the Series 20 Magnetic Latching Valves, as manufactured by Peter Paul Electronics Co., Inc. of New Britain, Conn.; the 30125-2.2-2R-B5+12V-DC-16-LC Magnetic Latching Valves, as manufactured by Rotex Automation Ltd. of Gujarat, Ind.; the LHLA series, manufactured by the Lee Company of Westbrook, Conn.; the S10MML series, manufactured by Pneumadyne, Inc. of Plymouth, Minn.; and the EF HVL283693001-12vdc, manufactured by ASCO Valve, Inc. of Florham Park, N.J.

In some implementations, the capacitor 144 may supply 13 W at an operational voltage for at least 50 ms. Exemplary capacitors include: 1.5-2.5 F, 5V capacitors, manufactured by Nesscap Co., Ltd. of Yongin-si, Gyeonggi-do, Republic of Korea; 0.5-3.0 F, 5V capacitors, manufactured by Cooper Bussmann, of St. Louis, Mo.; HS208 capacitors manufactured by Cap-XX Ltd. of Lane Cove, Australia.

In some implementations, the pressure sensor 155 may compensate for temperature. The pressure sensor 155 may be a 1% accurate sensor, although sensors with other sensitivities may be used (e.g., 2%). In some implementations, the pressure sensor 155 may communicate with the processing unit 148 and/or communication device 150 via wireless communication. For example, the pressure sensor 155 may transmit data about the pressure in the gas outlet 130 via radio frequency communication. Exemplary pressure sensors may include the Model 4425 pressure sensor manufactured by Measurement Specialities, of Hampton, Va.

In some implementations, the communication device 150 may include a radio frequency card. In some implementations, the processing unit 148 may include a MSP430F4619 processor. In some implementations, the battery 142 may include one or more battery units. For example, the battery 142 may include a single "D" cell battery. The battery 142 may include two (2) "D" cell batteries. The battery 142 may include four (4) "D" cell batteries. In some implementations, the battery may be non-rechargeable. In some implementations, the battery 142 may be a 3.6 V battery. In some implementations, the battery 142 may supply energy to operate the control valve 120, the pressure sensor 155, or both. In some implementations, a battery 142 used in the system 100 may operate at least the control valve 120 for up to 10 years without replacement. In some implementations, a battery 142 used in the system 100 may operate at least the control valve 120 for more than 10 years without replacement.

The systems, software, and methods described herein can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired. In any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files, such devices include magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks. Any of the foregoing can be supplemented by, or incorporated in, ASICs (application-specific integrated circuits).

Figure 2:
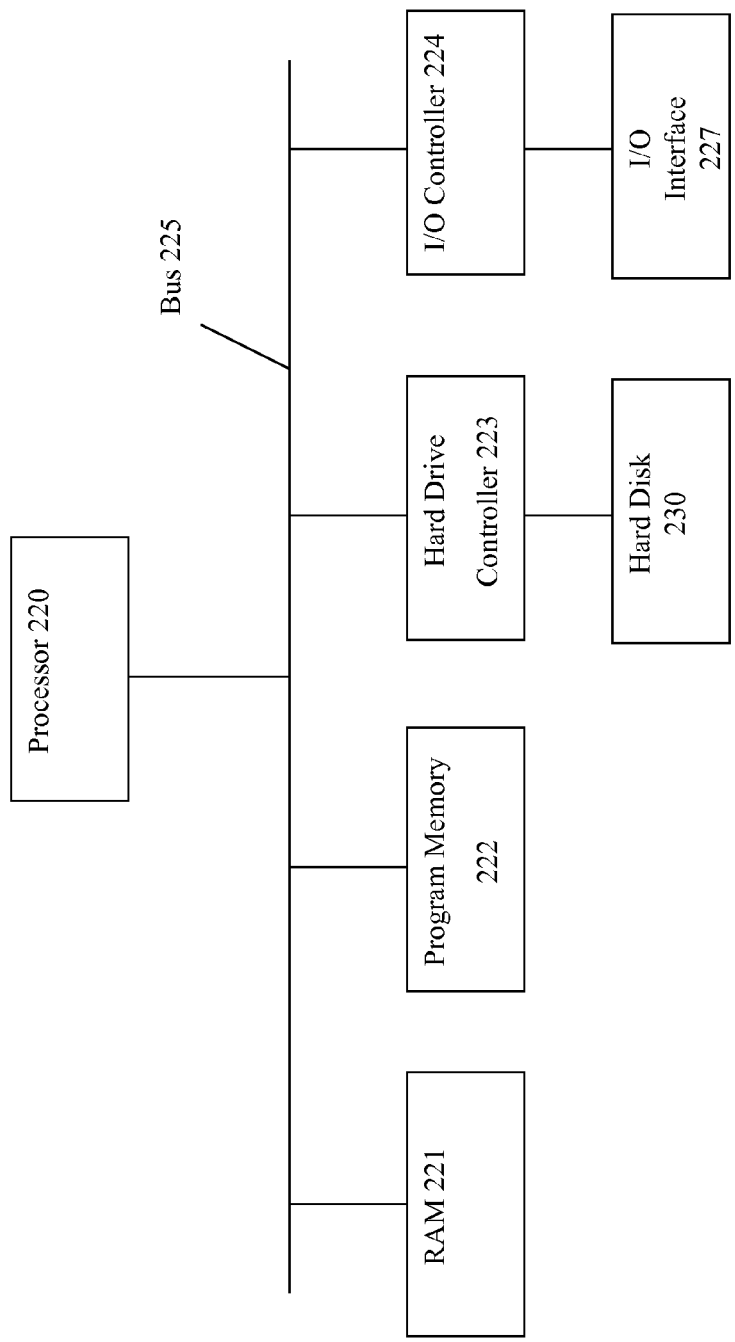
FIG. 2 is a block diagram of an exemplary computing device that may be used in the system of FIG. 1.

An example of one such type of computer is shown in FIG. 2, which shows a block diagram of a programmable processing system (system) 211 suitable for implementing or performing the apparatus or methods described herein. The system 211 includes a processor 220, a random access memory (RAM) 221, a program memory 222 (for example, a writeable read-only memory (ROM) such as a flash ROM), a hard drive controller 223, and an input/output (I/O) controller 224 coupled by a processor (CPU) bus 225. The system 211 can be preprogrammed, in ROM, for example, or it can be programmed (and reprogrammed) by loading a program from another source (for example, from a floppy disk, a CD-ROM, or another computer).

The hard drive controller 223 is coupled to a hard disk 230 suitable for storing executable computer programs, including programs embodying the present methods, and data including storage. The I/O controller 224 is coupled by an I/O bus 226 to an I/O interface 227. The I/O interface 227 receives and transmits data in analog or digital form over communication links such as a serial link, local area network, wireless link, and parallel link.

Elements of different implementations described herein may be combined to form other implementations not specifically set forth above. Other implementations not specifically described herein are also within the scope of the following claims.

Figure 3:
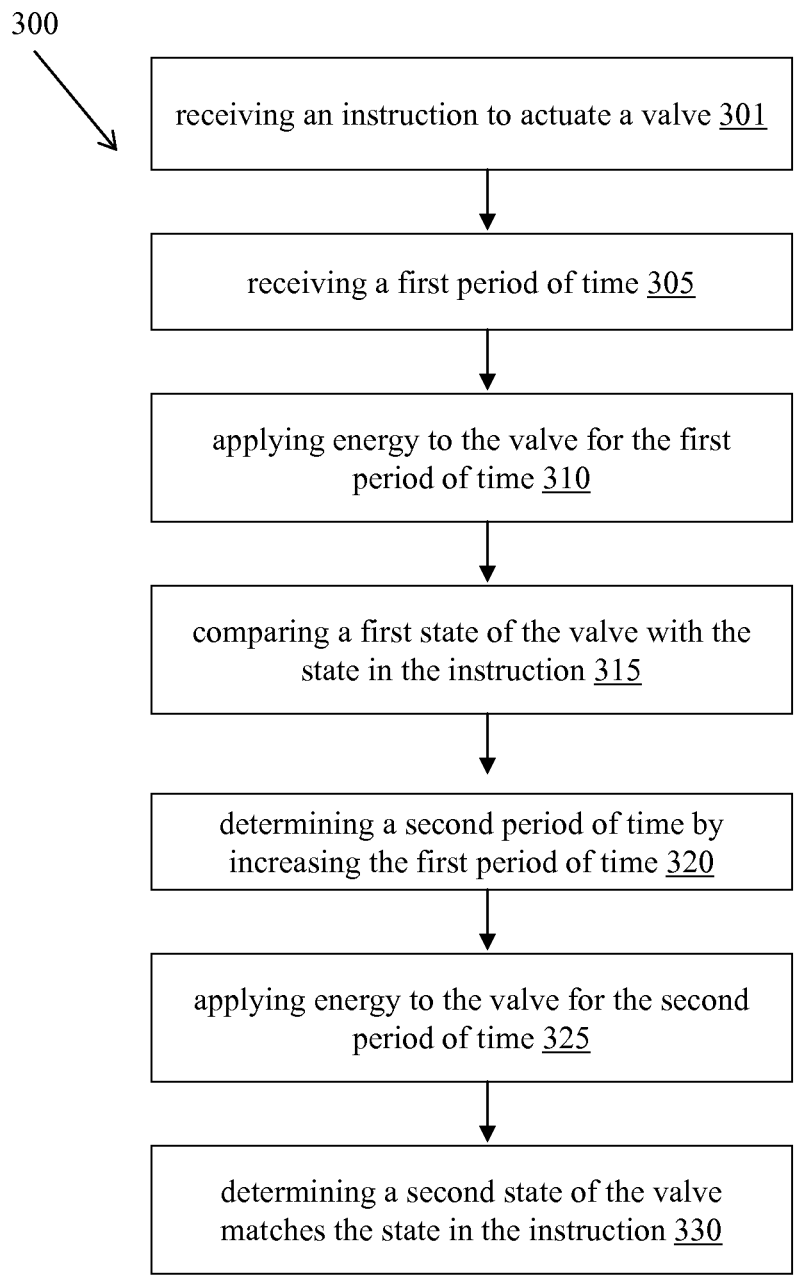
FIGS. 3-7 are flow diagrams of exemplary methods for operating a battery-powered control valve.

Referring now to FIG. 3, a flow diagram 300 for an exemplary method for operating a battery-powered control valve is shown and described. The method may include receiving an instruction to actuate a valve (step 301). A control unit 140 may receive the instruction from a remote unit. A communication device 150 of the control unit 150 may receive the instruction. The communication device 150 may receive the instruction wirelessly. In some implementations, the communication device 150 may receive the instruction via radio frequency communication. The instruction to actuate the valve may be an instruction to open a control valve (120). The instruction may be an instruction to close a control valve (120). Although the steps of the method are described herein regarding an instruction to open the valve, similar steps may be performed for an instruction to close the valve, as would be appreciate by one of ordinary skill in the art.

The method may include receiving a first period of time (step 305). In some implementations, the processing unit 148 may receive the first period of time from a remote unit. In some implementations, the processing unit 148 may receive the period of time by retrieving the period from a memory. The first period of time may be a period of time for powering a control valve 120 to open the valve. In some implementations, the first period of time may be a default value (e.g., 30 ms). In some implementations, the first period of time may be a period of time used in a prior successful attempt to open the control valve 120.

The method may include applying energy to the valve for the first period of time (step 310). In some implementations, the processing unit 148 determines an amount of energy that would be applied to the control valve 120 to open the valve. The amount of energy may be based on the first period of time, a capacitance of the capacitor 144, the voltage at which the control valve 120 may be operated, and/or any other factor, in any combination. A battery 142 may be used to charge the capacitor 144 with at least the determined amount of energy. The capacitor 144 may be charged so that the capacitor 144 may power the control valve 120 for the first period of time. In some implementations, when the capacitor 144 reaches an operational threshold of the control valve 120, the processing unit 148 may operate the DC/DC converter 147 to power the control valve 120 for the first period of time.

The method may include comparing a first state of the valve with the state in the instruction. In some implementations, the processing unit 148 may allow a predetermined period of time to elapse before determining the state of the control valve 120 (e.g., 20 seconds). A pressure sensor 155 may be disposed in a gas outlet 160 adjacent to the control valve 120. The sensor 155 may measure pressure from gas flowing through the gas outlet 160.

In some implementations, the processing unit 148 may compare the pressure with a threshold (e.g., 45 psi). When the pressure exceeds the threshold, the processing unit 148 may determine that the control valve 120 is open. When the threshold exceeds the pressure, the processing unit 148 may determine that the control valve 120 is closed. The processing unit 148 may compare the state of the control valve 120 with the desired state in the received instruction. If the states do not match, the processing unit 148 may determine that another attempt to actuate the control valve 120 may be made.

The method may include determining a second period of time by increasing the first period of time (step 315). In some implementations, the processing unit 148 may increase the first period of time by a predetermined period (e.g., 10 ms, 30 ms). The predetermined period may be equal to the default value of the open period of time. In some implementations, the processing unit 148 may increase the first period of time by a predetermined percentage (e.g., 10 ms). In some implementations, the processing unit 148 may increase the first period of time logarithmically.

The method may include applying energy to the valve for the second period of time (step 320). The energy may be applied according to any of the steps described herein, in any combination.

The method may include determining a second state of the valve matches the state in the instruction (step 325). The state of the control valve 120 after the control unit 150 has powered the valve 120 for the second period of time may be determined by any combination of steps described herein. In some implementations, the processing unit 148 may compare the state of the valve 120 with the desired state in the received instruction. When the states match, the processing unit 148 may determine that the use of the second period of time successfully actuated the control valve 120 (e.g., opened the valve 120). The processing unit 148 may store the second period of time. The processing unit 148 may overwrite the first period of time in memory with the second period. Thus, when the control unit 150 next receives an instruction to open the valve 120, the processing unit 148 may retrieve the second period of time and the control unit 150 may power the control valve 120 for the second period.

Figure 4:
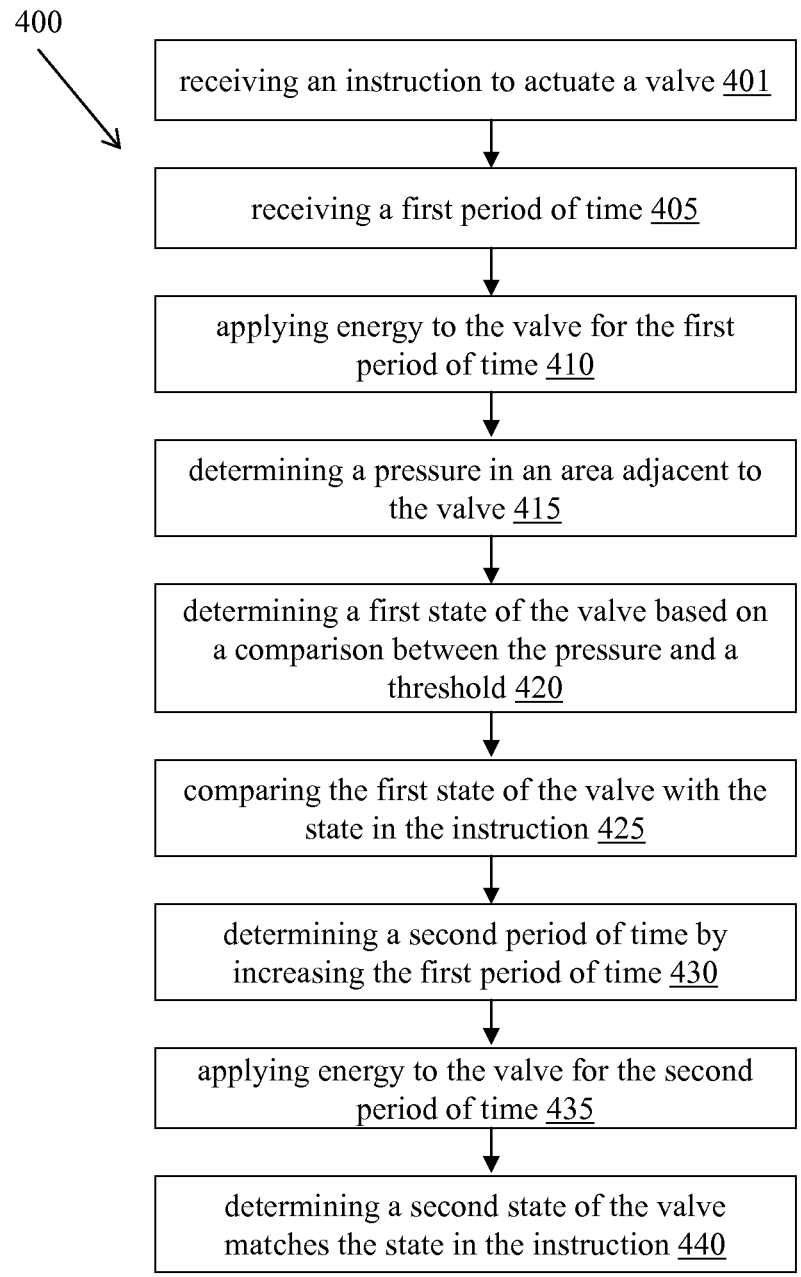

Referring now to FIG. 4, another flow diagram 400 for an exemplary method for operating a battery-powered control valve is shown and described. The method may include receiving an instruction to actuate a valve (step 401), receiving a first period of time (step 405), and/or applying energy to the valve for the first period of time (step 410). Steps 401, 405, and 410 may be performed according to steps described in reference to FIG. 3, or any other steps described herein.

The method may include determining a pressure in an area adjacent to the valve (step 415). A pressure sensor 155 may be disposed in a gas outlet 160 adjacent to a control valve 120. The sensor 155 may measure the pressure of gas flowing through the valve 120 into the outlet 160. In some implementations, after a predetermined period of time (e.g., the stabilization period described herein) has elapsed after the control unit 150 has powered the control valve 120, the processing unit 148 may process the pressure from the sensor 155.

The method may include determining a first state of the valve based on a comparison between the pressure and a threshold (step 420). The processing unit 148 may compare the pressure from the sensor 155 to a threshold (e.g., the pressure threshold described herein). If the pressure exceeds the threshold, the processing unit 148 may determine gas is flowing through an open control valve 120 into the gas outlet 160. If the threshold exceeds the pressure, the processing unit 148 may determine that a closed control valve 120 substantially precludes a flow of gas into the outlet 160.

The method may include comparing the first state of the valve with the state in the instruction (step 425), determining a second period of time by increasing the first period of time (step 430), applying energy to the valve for the second period of time (step 435), and determining a second state of the valve matches the state in the instruction (step 440). Steps 425, 430, 435, and 440 may be performed according to steps described in reference to FIG. 3, or any other steps described herein.

Figure 5:
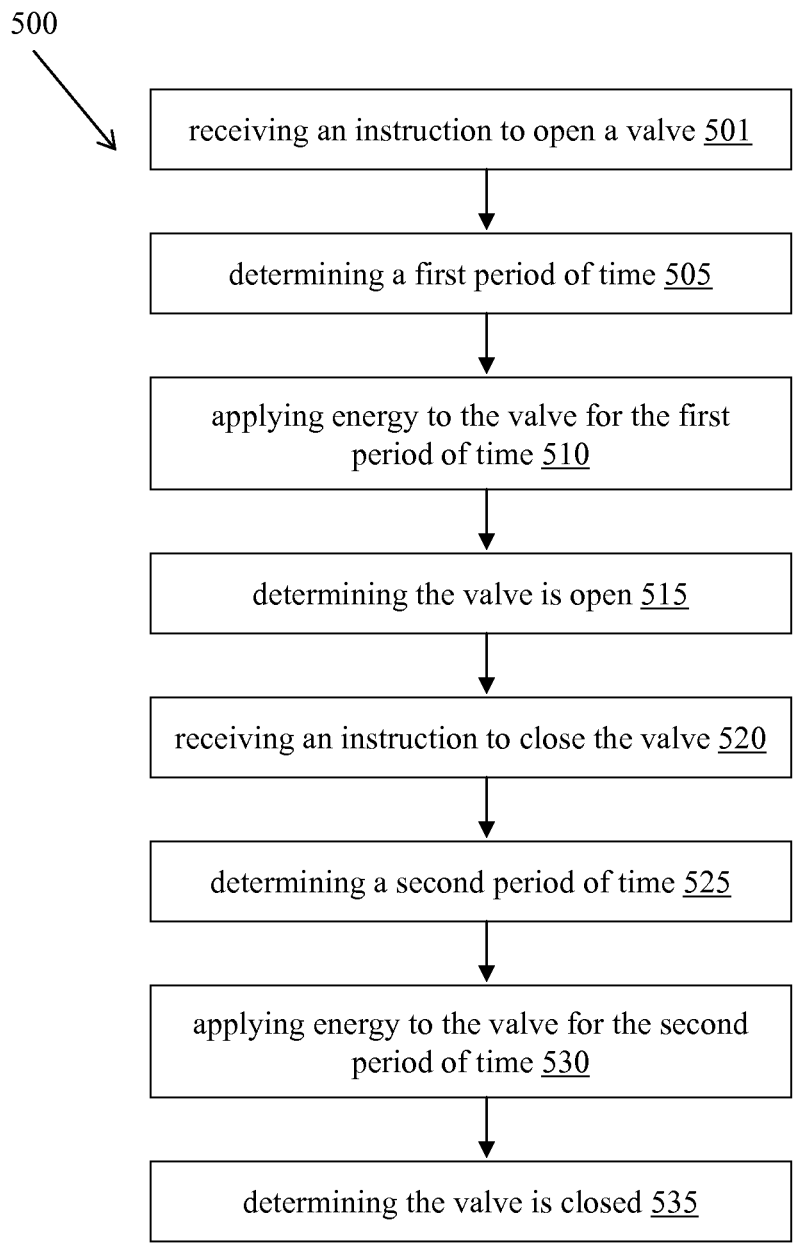

Referring now to FIG. 5, another flow diagram 500 for an exemplary method for operating a battery-powered control valve is shown and described. The method may include receiving an instruction to open a valve (step 501). Step 501 may be performed according to steps described in reference to FIG. 3 or 4, or any other steps described herein.

The method may include determining a first period of time (step 505). The first period of time may be associated with opening a control valve 120 and/or an attempt to open the valve 120. In some implementations, the first period of time may be a default value (e.g., 30 ms). In some examples, upon system 100 start-up and/or recovery, a processing unit 148 may initialize the first period of time to the default value. In some examples, after a number of consecutive successful actuations for opening the valve 120 has reached a threshold, as described herein, the processing unit 148 may initialize the first period of time to the default value. In some implementations, the first period of time may be a period previously used to open the control valve 120 successfully. In some implementations, the processing unit 148 may retrieve the first period of time from memory.

The method may include applying energy to the valve for the first period of time (step 510). Step 510 may be performed according to steps described in reference to FIG. 3 or 4, or any other steps described herein.

The method may include determining the valve is open (step 515). A pressure sensor 155 may be disposed in a gas outlet 160 adjacent to a control valve 120. The sensor 155 may measure the pressure of gas flowing through the valve 120 into the outlet 160. In some implementations, after a predetermined period of time (e.g., the stabilization period described herein) has elapsed after the control unit 150 has applying energy to the valve 120 for the first period of time, the processing unit 148 may process the pressure from the sensor 155. The processing unit 148 may compare the pressure from the sensor 155 to a threshold (e.g., the pressure threshold described herein). When the pressure exceeds the threshold, the processing unit 148 may determine the control valve 120 is open and gas is flowing through the valve 120 into the gas outlet 160.

The method may include receiving an instruction to close the valve (step 520). Step 520 may be performed according to steps described in reference to FIG. 3 or 4, or any other steps described herein.

The method may include determining a second period of time (step 525). The second period of time may be associated with closing a control valve 120 and/or an attempt to close the valve 120. The second period of time may be different from the first period of time. The second period may be stored separately from the first period. In some implementations, the second period of time may be a default value (e.g., 10 ms). The default value for the second period may be different from the default value for the first period.

In some examples, upon system 100 start-up and/or recovery, a processing unit 148 may initialize the second period of time to the default value. In some examples, after a number of consecutive successful actuations for closing the valve 120 has reached a threshold, as described herein, the processing unit 148 may initialize the second period of time to the default value. In some implementations, the second period of time may be a period previously used to close the control valve 120 successfully. In some implementations, the processing unit 148 may retrieved the second period of time from memory.

The method may include applying energy to the valve for the second period of time (step 530). Step 530 may be performed according to steps described in reference to FIG. 3 or 4, or any other steps described herein.

The method may include determining the valve is closed (step 535). In some implementations, after a predetermined period of time (e.g., the stabilization period described herein) has elapsed after the control unit 150 has applying energy to the valve 120 for the second period of time, the processing unit 148 may process the pressure from the sensor 155. The processing unit 148 may compare the pressure from the sensor 155 to a threshold (e.g., the pressure threshold described herein). When the threshold exceeds the pressure, the processing unit 148 may determine the control valve 120 is closed and no gas is flowing into the gas outlet 160.

Figure 6:
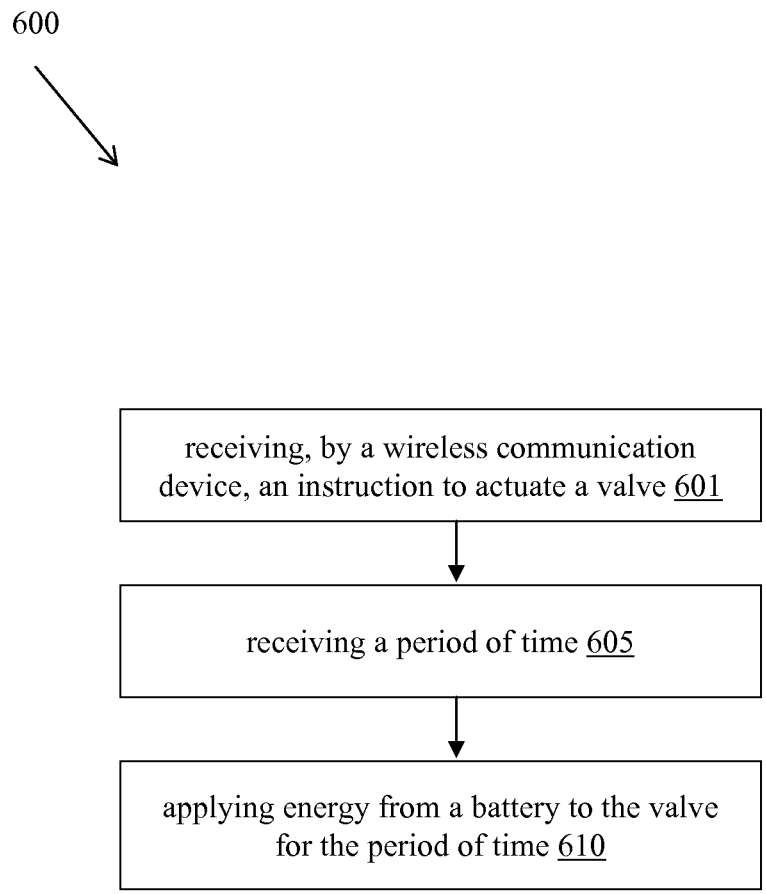

Referring now to FIG. 6, another flow diagram 600 for an exemplary method for operating a battery-powered control valve is shown and described. The method may include receiving an instruction to actuate a valve (step 601). A control unit 140 may receive the instruction from a remote unit. A communication device 150 of the control unit 140 may receive the instruction. The communication device 150 may be a wireless communication device 150. For example, the device 150 may receive and/or transmit radio frequency signals. In some implementations, the instruction may include a desired state of a control valve 120. For example, the instruction may be an instruction to open the control valve 120 or an instruction to close the control valve 120.

The method may include receiving a period of time (step 605). The period of time may be associated with the desired state of the control valve 120 included in the instruction. For example, if the communication device 150 received an instruction to open the valve 120, the period of time may be a period for powering the control valve 120 to attempt to open the valve 120. In some implementations, the period of time may be a default valve, as described herein. In some implementations, the period of time may be a period previously used in a successful attempt to open the control valve 120, as described herein. In some implementations, the processing unit 148 may retrieve the period of time from memory.

The method may include applying energy from a battery to the valve for the period of time (step 610). Step 610 may be performed according to steps described in reference to FIGS. 3-5, or any other steps described herein.

Figure 7:
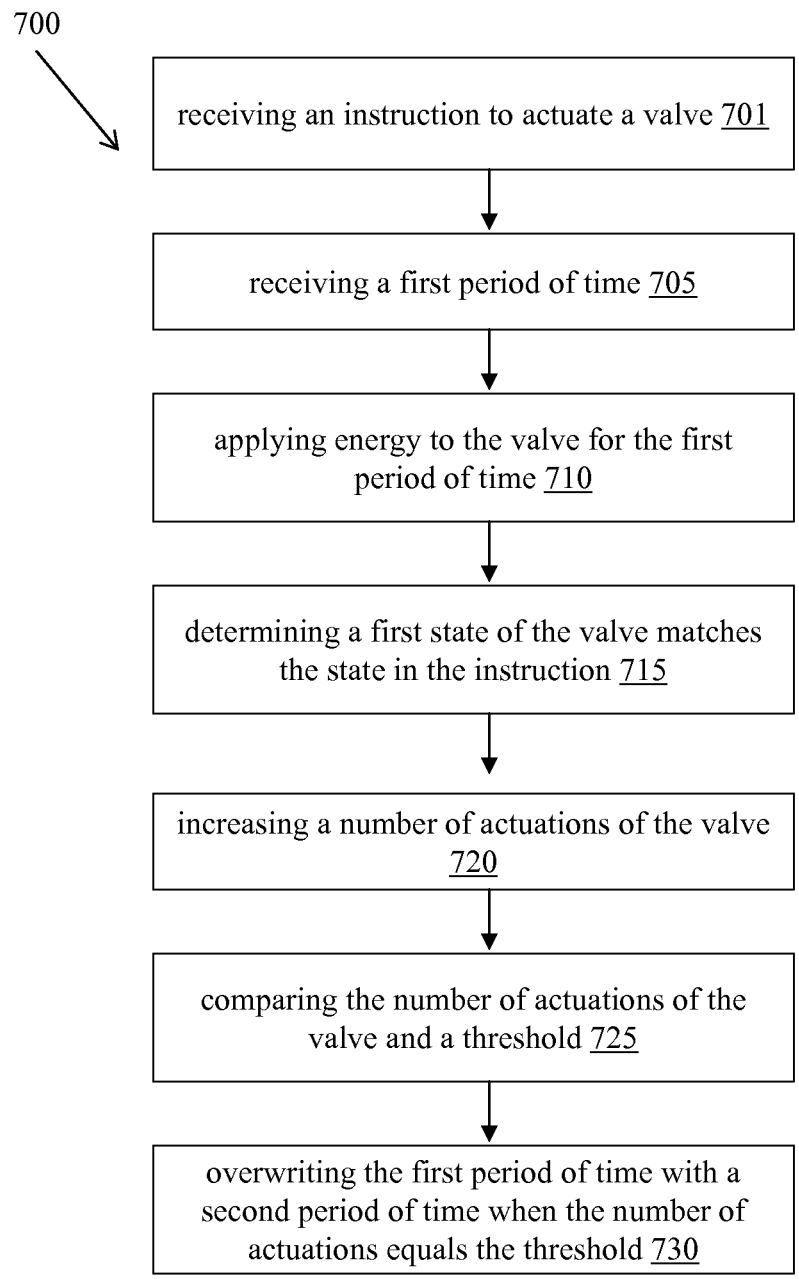

Referring now to FIG. 7, another flow diagram 700 for an exemplary method for operating a battery-powered control valve is shown and described. The method may include receiving an instruction to actuate a valve (step 701), receiving a first period of time (step 705), applying energy to the valve for the first period of time (step 710), and determining a first state of the valve matches the state in the instruction (step 715). Steps 701, 705, 710, and 715 may be performed according to steps described in reference to FIGS. 3-6, or any other steps described herein.

The method may include increasing a number of actuations of the valve (step 720). The number of actuations of the valve may be a number of successful consecutive actuations to open the control valve 120. The number may be a number of successful consecutive actuations to close the control valve 120. In some implementations, the number may be a total number of successful actuations. A processing unit 148 may increase the number of actuations each time an attempt to actuate the control valve 120 succeeds.

The method may include comparing the number of actuations of the valve and a threshold (step 725) and overwriting the first period of time with a second period of time when the number of actuations of the valve equals the threshold (step 730). The threshold may be twenty-four (24) actuations, although any value may be used. The second period of time may be a default value (e.g., 30 ms for the open period, 10 ms for the close period). In some implementations, the processing unit 148 may determine the second period by decreasing the first period. The processing unit 148 may decrease the first period by a predetermined period (e.g., 10 ms, 30 ms). In some implementations, the processing unit 148 may decrease the first period by a predetermined percentage (e.g., 5%, 10%). The processing unit 148 may overwrite the first period in memory.

While various embodiments of the methods and systems have been described, these embodiments are exemplary and in no way limit the scope of the described methods or systems. Those having skill in the relevant art may effect changes to form and details of the described methods and systems without departing from the broadest scope of the described methods and systems. Thus, the scope of the methods and systems described herein should not be limited by any of the exemplary implementations and should be defined in accordance with the accompanying claims and their equivalents.

What is claimed is:

1. A method comprising:
   receiving, by a communication device, an instruction to actuate a valve;
   receiving, by a processing unit, a first period of time;
   applying, by the processing unit, energy to the valve for the first period of time;
   comparing, by the processing unit, a first state of the valve with a state in the instruction to determine if the valve is open or closed;

determining, by the processing unit, a second period of time by increasing the first period of time;

applying, by the processing unit, energy to the valve for the second period of time; and determining, by the processing unit, that a second state of the valve matches the state in the instruction.

2. The method of claim 1, wherein receiving the instruction to actuate further comprises:

receiving an instruction to open the valve.

3. The method of claim 1, wherein receiving the instruction to actuate further comprises:

receiving an instruction to close the valve.

4. The method of claim 1, wherein receiving the instruction to actuate further comprises:

receiving the instruction through wireless communication.

5. The method of claim 1, wherein receiving the first period of time further comprises:

retrieving a default period of time associated with actuating the valve to the state in he instruction.

6. The method of claim 5, wherein receiving the default period of time further comprises:

retrieving a period about 10 ms.

7. The method of claim 5, herein receiving the default period of time further comprises:

retrieving a period of about 30 ms.

8. The method of claim 1, wherein receiving the first period of time further comprises:

retrieving a period of time previously used to actuate the valve to the state in the instruction.

9. The method of claim 1, wherein applying the energy to the valve further comprises:

applying current to a coil of a solenoid latching valve.

10. The method of claim 1, wherein applying the energy to the valve further comprises:

charging a capacitor with energy from a non-rechargeable battery; and applying current to the valve using energy from the capacitor.

11. The method of claim 1, wherein comparing the first state of the valve with the state in the instruction further comprises:

determining that the first state of the valve does not match the state in the instruction.

12. The method of claim 1, wherein comparing the first state of the valve with the state in the instruction further comprises:

determining, by a pressure sensor, a pressure in an area adjacent to the valve;

determining, by the processing unit, the first state of the valve based at least in part on the pressure; and determining, by the processing unit, that the first state of the valve does not match the state in the instruction.

13. The method of claim 1, wherein determining the second period of time further comprises;

increasing the first period of time by a fixed period of time.

14. The method of claim 1, wherein determining the second period of time further comprises:

increasing the first period of time by a percentage.

15. The method of claim 1, wherein determining that the second state of the valve matches the state in the instruction further comprises:

overwriting the first period of time with the second period of time.

16. A method comprising:

receiving, by a communication device, an instruction to actuate a valve;

receiving, by a processing unit, a first period of time;

applying, by the processing unit, energy to the valve for the first period of time;

determining, by a pressure sensor, a pressure in an area adjacent to the valve;

determining, by the processing unit, a first state of the valve based on a comparison between the pressure and a threshold, the first state being one of open and closed;

comparing, by the processing unit, the first state of the valve with the state in the instruction;

determining, by the processing unit, a second period of time by increasing the first period of time;

applying, by the processing unit, energy to the valve for the second period of time; and determining, by the processing unit, that a second state of the valve matches the state in the instruction.

17. A system comprising:

a communication device that receives an instruction to actuate a valve from a remote unit;

a processing a battery;

a capacitor;

a pressure sensor; and a memory, the memory storing instructions that, when executed by the processing unit, cause the processing unit to:

receive a first period of time;

operate the battery and the capacitor to apply energy to a valve for he first period of time;

determine a first state of the valve based on a comparison between a threshold and a pressure measurement from the pressure sensor disposed in a gas outlet adjacent to the valve to determine if the valve is one of open and closed;

determine the first state of the valve does not match a state in the instruction;

determine a second period of time by increasing the first period of time;

operate the battery and the capacitor to apply energy to the valve for the second period of time; and determine a second state of e valve matches the state in the instruction.

* * * * *

UNITED STATES PATENT AND TRADEMARK OFFICE
CERTIFICATE OF CORRECTION

PATENT NO. : 8,924,028 B2  
APPLICATION NO. : 13/195258  
DATED : December 30, 2014  
INVENTOR(S) : Paul C. Neilson et al.

Page 1 of 1

It is certified that error appears in the above-identified patent and that said Letters Patent is hereby corrected as shown below:

In the Claims

Column 17, claim 5, line 19, replace "in he instruction" with --in the instruction--;

Column 17, claim 6, line 22, before "about" add "of";

Column 17, claim 7, line 23, replace "herein" with --wherein--;

Column 18, claim 17, line 31, after "processing" add "unit";

Column 18, claim 17, line 40, replace "for he first" with --for the first--; and Column 18, claim 17, line 54, replace "of e valve" with --of the valve--.

Signed and Sealed this  
Thirty-first Day of March, 2015

Michelle K. Lee  
*Director of the United States Patent and Trademark Office*